United States Patent
Mabuchi et al.

(10) Patent No.: US 8,902,620 B2
(45) Date of Patent: Dec. 2, 2014

(54) POWER CONDITIONER

(71) Applicant: Omron Corporation, Kyoto (JP)

(72) Inventors: Masao Mabuchi, Shiga (JP); Kazuyoshi Imamura, Shiga (JP); Yasuhiro Tsubota, Shiga (JP); Takao Mizokami, Shiga (JP); Katsutaka Tanabe, Shiga (JP); Kotaro Nakamura, Shiga (JP); Teruyuki Maeda, Shiga (JP); Nobuyuki Toyoura, Shiga (JP); Mio Yamada, Fukuoka (JP)

(73) Assignee: Omron Corporation, Kyoto (JP)

( * ) Notice: Subject to any disclaimer, the term of this patent is extended or adjusted under 35 U.S.C. 154(b) by 198 days.

(21) Appl. No.: 13/718,090

(22) Filed: Dec. 18, 2012

(65) Prior Publication Data

US 2013/0107596 A1    May 2, 2013

Related U.S. Application Data

(63) Continuation of application No. PCT/JP2011/056535, filed on Mar. 18, 2011.

(30) Foreign Application Priority Data

Sep. 13, 2010 (JP) ................................ 2010-204318

(51) Int. Cl.
     *H02M 7/5387*    (2007.01)
     *H02M 7/48*    (2006.01)
     *H02J 3/38*    (2006.01)
     *H02M 1/12*    (2006.01)

(52) U.S. Cl.
     CPC .............. *H02M 7/5387* (2013.01); *H02M 7/48* (2013.01); *H02J 3/383* (2013.01); *H02M 1/12* (2013.01); *Y02E 10/563* (2013.01)
     USPC ............................................ 363/124; 363/65

(58) Field of Classification Search
     USPC .......... 363/65, 71, 95, 98, 123–127, 131–132
     See application file for complete search history.

(56) References Cited

U.S. PATENT DOCUMENTS 5,045,989 A * 9/1991 Higaki et al. .................... 363/37
5,111,373 A * 5/1992 Higaki ............................. 363/37

(Continued)

FOREIGN PATENT DOCUMENTS

| JP | 2002-10496 | 1/2002 |
| JP | 2004-7941 | 1/2004 |

(Continued)

OTHER PUBLICATIONS

U.S. Appl. No. 13/718,244 to Mabuchi et al., which was filed Dec. 18, 2012.

(Continued)

*Primary Examiner* — Adolf Berhane
*Assistant Examiner* — Henry Lee, III
(74) *Attorney, Agent, or Firm* — Greenblum & Bernstein, P.L.C.

(57) ABSTRACT

A power conditioner that suppresses distortion in a waveform of a sinusoidal generated voltage includes a first and second group including two switches each connected in inverse parallel and in series. The power conditioner alternately turns on and off both switches in the first group at a prescribed chopping frequency and alternately turns on and off both switches in the second group at a PWM frequency higher than the chopping frequency. If control is performed with a dead-time provided in the on/off timing for both switches in each group, the power conditioner adjusts and controls the on/off duty for the second group switches to correspond to the effective on drive in one switch by each diode during the dead-time for each switch in the first group.

3 Claims, 8 Drawing Sheets

(56) References Cited

U.S. PATENT DOCUMENTS

| | | | |
|---|---|---|---|
| 8,184,462 B2 | 5/2012 | Mabuchi et al. | |
| 8,471,535 B2 * | 6/2013 | Kora et al. | 323/222 |
| 2010/0232192 A1 | 9/2010 | Mabuchi et al. | |
| 2011/0273916 A1 * | 11/2011 | Fujiwara et al. | 363/71 |

FOREIGN PATENT DOCUMENTS

| | | |
|---|---|---|
| JP | 2004-120979 | 4/2004 |
| JP | 2009-165222 | 7/2009 |
| JP | 2010-11702 | 1/2010 |
| JP | 2010-35252 | 2/2010 |
| JP | 2010-220320 | 9/2010 |
| WO | 2008/102552 | 8/2008 |
| WO | 2012/035807 | 3/2012 |

OTHER PUBLICATIONS

International Search Report in related PCT/JP2011/056535 dated May 17, 2011, with an English language translation thereof.

* cited by examiner

POWER CONDITIONER

CROSS-REFERENCE TO RELATED APPLICATIONS

This is a continuation application of PCT/JP2011/056535 filed Mar. 18, 2011, designating the United States of America, the disclosure of which, including the specification, drawings, and claims, is incorporated by reference in its entirety. The disclosure of Japanese Patent Application No. 2010-204318 filed Sep. 13, 2010, including the specification, drawings, and claims is expressly incorporated herein by reference in its entirety.

FIELD OF DISCLOSURE

The present disclosure relates to a power conditioner used in a chopper type power conversion apparatus that chops a DC power to convert the DC power into an AC power.

BACKGROUND INFORMATION

Nowadays, a power generation system, in which a photovoltaic cell, a fuel cell, and the like having less influence on an environment are used, is actively developed from the viewpoint of global environment protection.

In some of the power generation systems, a DC power from DC power sources, such as the photovoltaic cell, which generate an electric power, is converted into an AC power having a commercial frequency that is linked to a system by a power conditioner. The post-conversion AC power is supplied to a domestic load connected to a commercial electric power system. On the other hand, an excess power flows back to a system side when the electric power generated by the DC power source is higher than a consumed power of the domestic load.

The power conditioner used in the power generation system generally includes an inverter that converts the DC power generated by the photovoltaic cell and the like into the AC power and a protection device that is used in system linkage. The power conditioner is roughly divided into an insulation type in which a DC unit and an AC unit are electrically insulated by an insulation transformer and a non-insulation type in which the insulation transformer is not used. The non-insulation type is frequently used because the non-insulation type is excellent in power conversion efficiency compared with the insulation type (for example, see Patent Document 1).

Patent Document 1: Japanese Unexamined Patent Publication No. 2002-10496

Problems to be Solved by the Disclosure

Figure 9:
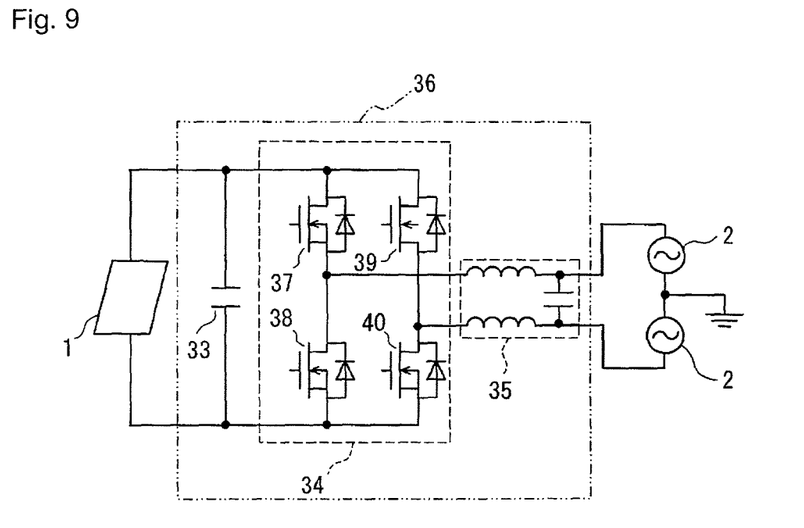
FIG. 9 is a configuration diagram of a conventional example.

FIG. 9 illustrates a configuration example of a photovoltaic power generation system including a non-insulation type power conditioner. A power conditioner 36 performs a linkage operation with a commercial power source 2. The power conditioner 36 includes a smoothing capacitor 33, a PWM-control inverter 34, a filter 35 including a reactor and a capacitor, and a control circuit (not illustrated). The smoothing capacitor 33 smoothes a power generation output from a photovoltaic panel 1. The inverter 34 is constructed by switch elements 37 to 40 that include four MOSFETs in which a diode is connected in inversely parallel. Switching control is performed to the switch elements 37 to 40 of the inverter 34 at a high frequency of about 18 kHz, whereby the power generation output of the photovoltaic panel 1, which is smoothed by the smoothing capacitor 33, is converted into the AC power synchronized with the commercial electric power system. The power conditioner 36 supplies the converted AC power to a load (not illustrated) through the filter 35 or flows the AC power back to the system side.

In the PWM-control inverter 34 included in the power conditioner 36, it is necessary to convert the DC power having a high voltage, for example, about 800 V from the photovoltaic panel 1 into the AC power by performing the switching operation of the switch elements 37 to 40 at the high frequency of about 18 kHz. Therefore, in the power conversion apparatus including the conventional power conditioner 36, a large switching loss is generated in the electric power conversion of the power conditioner 36, which results in a problem of the low power conversion efficiency.

In order to solve the problem, the inventors filed Japanese Patent Application No. 2009-61915, "Power conversion apparatus, power conditioner, and power generation system", on Mar. 13, 2009. However, in the power conditioner of Japanese Patent Application No. 2009-61915, unfortunately there is a high possibility that a distortion is partially generated in a waveform of a generated sinusoidal voltage.

An object of the present disclosure is to improve the power conditioner of Japanese Patent Application No. 2009-61915 and provide a power conditioner that suppresses the partial generation of the distortion in waveform of the generated sinusoidal voltage.

Summary of the Disclosure

A power conditioner according to a first aspect of the present disclosure includes a first group (first switch circuit), a second group (second switch circuit), and control means (a controller processor). The first group includes two switch elements (switches) connected in series with each other, a diode is connected in inversely parallel with each of the switch elements, and the switch elements are alternately turned on and off at a predetermined chopping frequency. The second group includes two switch elements connected in series with each other, a diode is connected in inversely parallel with each of the switch elements, and the switch elements are alternately turned on and off at a PWM frequency higher than the chopping frequency. The control means performs on/off control of each of the switch elements of the first and second groups while a deadtime is provided. The control means adjusts and controls on/off duty of the switch elements in the second group according to an effective on drive in one of the switch elements using each diode during the deadtimes of the switch elements of the first group.

A power conditioner according to a second aspect of the present disclosure includes first and second groups (first and second switch circuits), a capacitor, and control means (a controller processor). The first and second groups are connected in parallel with each other, each of the first and second groups includes two switch elements (switches) connected in series with each other, and a diode is connected in inversely parallel with each of the switch elements. The capacitor is connected in parallel with each of the first group and the second group. The control means alternately turns on and off the switch elements of the first group at a predetermined chopping frequency and alternately turns on and off the switch elements of the second group at a PWM frequency higher than the chopping frequency, and the control means performs the control while a deadtime is provided in on/off timing of each of the switch elements of the first and second groups. The control means forms a pulse voltage series in a first series-connected portion of the switch elements of the first group, and forms a difference voltage according to a difference between the pulse voltage series and a sinusoidal voltage in a second series-connected portion of the switch elements of the second group. The control means controls on/off duty of the switch elements of the second group to obtain the sinusoidal voltage that changes to positive and negative sides. The control means according to the power conditioner adjusts and controls the on/off duty of the switch elements of the second group according to an effective on drive in one of the switching elements using each diode during the deadtimes of the switch elements of the first group.

A power conditioner according to a third aspect of the present disclosure includes first to third chopper circuits and control means (a controller processor). The first chopper circuit includes a first switch circuit that includes first and second switch elements (switches) connected in series with each other, and a diode is connected in inversely parallel with each of the first and second switch elements. The first and second switch elements are alternately turned on and off at a first chopping frequency to generate a first pulse voltage series having a positive-side voltage with respect to a first reference potential. The second chopper circuit includes a parallel-connected circuit that includes a second capacitor and a second switch circuit. One side of a parallel connection of the parallel-connected circuit is connected to the series-connected portion of the first and second switch elements. The second switch circuit includes third and fourth switch elements connected in series with each other, and a diode is connected in inversely parallel with each of the third and fourth switch elements. The third and fourth switch elements are alternately turned on and off at a second chopping frequency higher than the first chopping frequency, the third and fourth switch elements generate a second pulse voltage series having a voltage V2 while a potential at the first pulse voltage series is set to a second reference potential. A voltage level of the voltage V2 is lower than that of the first pulse voltage series, and the voltage V2 becomes a negative side with respect to the second reference potential. The third and fourth switch elements add voltages at the first and second pulse voltage series to form a third pulse voltage series that changes alternately in a sinusoidal manner to the positive and negative sides with respect to the first reference potential. The third chopper circuit includes a third switch circuit, seventh and eighth switch elements, and a capacitor. The third switch circuit includes fifth and sixth switch elements connected in series with each other, and a diode connected in inversely parallel with each of the fifth and sixth switch elements. The seventh and eighth switch elements are connected in series with each other, and a diode is connected in inversely parallel with each of the seventh and eighth switch elements. The capacitor is connected in parallel with the third switch circuit and the seventh and eighth switch elements. A series-connected portion of the fifth and sixth switch elements is connected to a series-connected portion of the third and fourth switch elements. The fifth and sixth switch elements are alternately turned on and off at a third chopping frequency higher than the second chopping frequency to generate a difference voltage between the third pulse voltage series and a sinusoidal voltage. The seventh and eighth switch elements are turned on and off at a PWM frequency higher than the third chopping frequency to obtain the sinusoidal voltage at the series-connected portion of the seventh and eighth switch elements. The control means controls on/off duty of the seventh and eighth elements according to an on drive of one of upper and lower switching elements in the first to third switch circuits during deadtimes of the upper and lower switch elements using each diode that is connected in inversely parallel with each of the upper and lower switch elements.

As used herein, "changing alternately in a sinusoidal manner on positive and negative sides" means the positive (one)-side pulse voltage and the negative (the other)-side pulse voltage emerge alternately at a constant cycle with respect to the reference potential, and preferably the pulse cycle is matched with the sinusoidal wave cycle.

Preferably the sinusoidal voltage used to obtain the difference with the pulse voltage series is the sinusoidal voltage that becomes an electric power conversion target, namely, a target value (an instruction value) of the sinusoidal voltage.

The present disclosure can include a power conversion apparatus that chops the DC power to convert the DC power into the AC power. That is, although the present disclosure has the title of the power conditioner, the power conditioner can include the power conversion apparatus.

The present disclosure can be applied to the power conditioner in the power generation system, in which the DC power generated by the DC power source is converted into the AC power by the power conditioner and linked to the commercial power source. At this point, the DC power source can include power sources, such as the photovoltaic cell, the fuel cell, and wind power generation, which generate the DC power.

Effect of the Disclosure

According to the power conditioner of the present disclosure, the sinusoidal voltage is obtained by controlling the on/off timing of each of the series-connected two switch elements, and the distortion in part of the waveform of the sinusoidal voltage due to the effective on of one of the switch elements during a deadtime can be suppressed in the circuit having the system in which the deadtime is provided when the switch elements are on and off.

DETAILED DESCRIPTION

Hereinafter, an embodiment of the present disclosure will be described with reference to the drawings.

Figure 1:
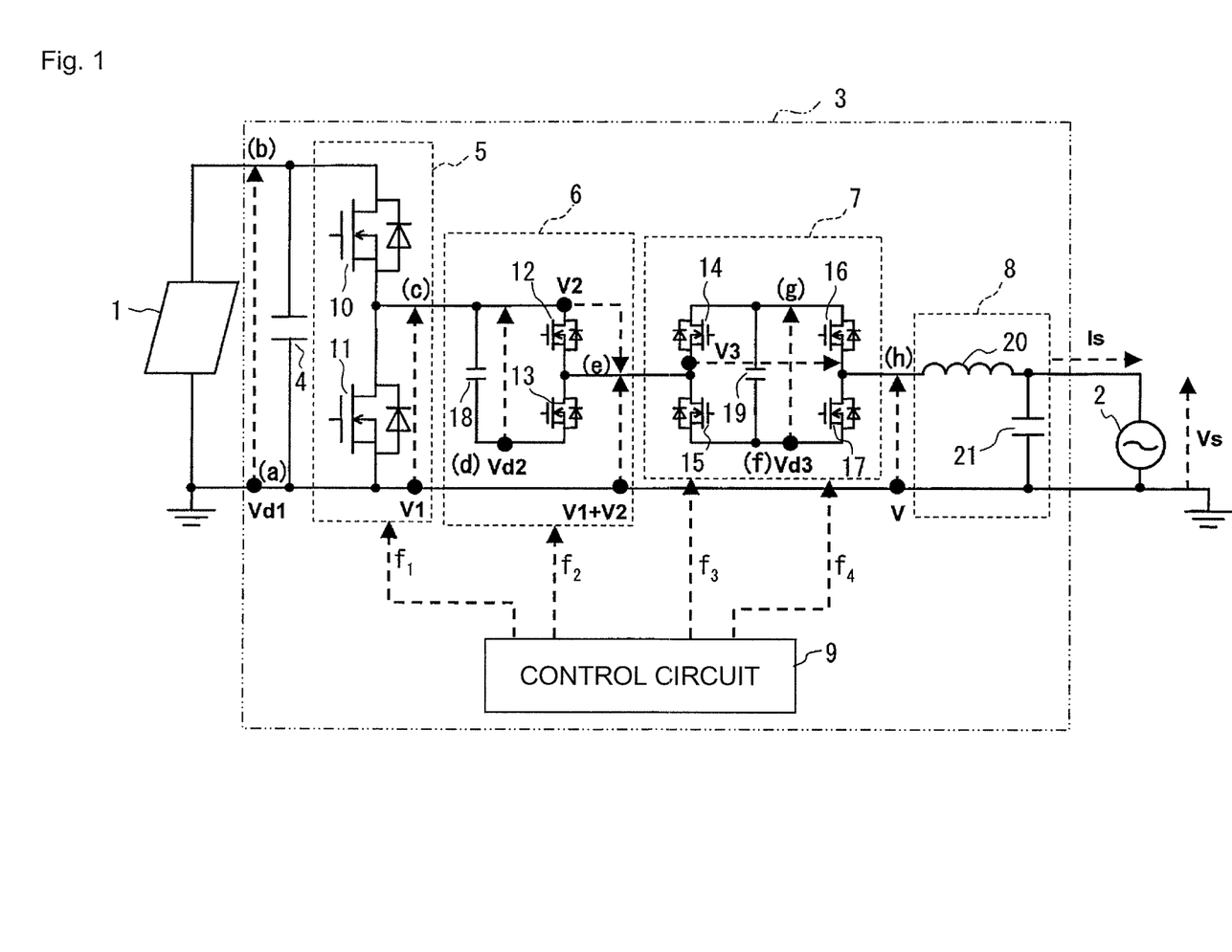
FIG. 1 is a configuration diagram of a photovoltaic power generation system according to an embodiment of the present disclosure.

FIG. 1 is a configuration diagram of a photovoltaic power generation system according to an embodiment of the present disclosure, and illustrates a configuration in the case of a single-phase two-wire system.

The photovoltaic power generation system of the embodiment includes a photovoltaic panel 1, and a power conditioner 3 which converts a DC power from the photovoltaic panel 1 into an AC power and performs a linkage operation with a commercial power source 2.

The photovoltaic panel 1 is configured such that plural photovoltaic modules are connected in series and/or parallel to obtain required electric power. The photovoltaic panel 1 of the embodiment is constructed by an amorphous silicon thin-film photovoltaic cell. The power conditioner 3 of the embodiment is a non-insulation type transformer-less power conditioner that does not include the insulation transformer. The power conditioner 3 includes a first capacitor 4 that is of a smoothing capacitor, first to third chopper circuits 5 to 7, a noise filter 8, and a control circuit 9 that measures voltage at each unit to control the chopper circuits 5 to 7.

The first to third chopper circuits 5 to 7 and the control circuit 9 constitute a chopper converter that is cascade-connected to the photovoltaic panel 1. A negative-electrode side of the photovoltaic panel 1 is connected to the ground. In FIG. 1, a point (a) designates the ground, and the ground has a voltage of zero. A point (b) designates a positive-electrode side of the photovoltaic panel 1. The first capacitor 4 is connected in parallel between the positive and negative electrodes of the photovoltaic panel 1.

The first chopper circuit 5 is connected in parallel with the first capacitor 4. The first chopper circuit 5 includes first and second switch elements 10 and 11 that are connected in series with each other. A diode is connected in inversely parallel with each of the first and second switch elements 10 and 11.

The first chopper circuit 5 constitutes a first switch circuit using the first and second switch elements 10 and 11.

In the first chopper circuit 5, using a gate signal from the control circuit 9, ON/OFF control is alternately performed to the first and second switch elements 10 and 11 at a first chopping frequency f1 that is equal to a system frequency, for example, 50 Hz. For example, the first and second switch elements 10 and 11 are constructed by N-channel MOSFETs like switch elements 12 to 17 of the second and third chopper circuits 6 and 7. The switch element is not limited to the MOSFET, but an IGBT or a transistor may be used as the switch element.

The second chopper circuit 6 includes a second capacitor 18 and a second switch circuit that is constructed by series connection of the third and fourth switch elements 12 and 13, in each of which the diode is connected in inversely parallel. The second capacitor 18 and the second switch circuit are connected in parallel with each other. Using the gate signal from the control circuit 9, the ON/OFF control is alternately performed to the third and fourth switch elements 12 and 13 at a second chopping frequency f2, for example, at 100 Hz which is double the first chopping frequency f1.

One end side of the parallel connection of the second capacitor 18 and the second switch circuit in the second chopper circuit 6 is connected to a series-connected portion of the first and second switch elements 10 and 11 in the first chopper circuit 5. In FIG. 1, a point (c) designates the connection point. In FIG. 1, points (c) and (d) correspond to both capacitor electrode sides of the second capacitor 18.

The third chopper circuit 7 includes a third switch circuit, a third capacitor 19, and a fourth switch circuit. The third switch circuit is constructed by the series connection of the fifth and sixth switch elements 14 and 15, in each of which the diode is connected in inversely parallel. The fourth switch circuit is constructed by the series connection of the seventh and eighth switch elements 16 and 17, in each of which the diode is connected in inversely parallel. In the third chopper circuit 7, the third switch circuit, the third capacitor 19, and the fourth switch circuit are connected in parallel with one another. In FIG. 1, points (f) and (g) designate one end side and the other end side of the parallel connection of the third switch circuit, the third capacitor 19, and the fourth switch circuit. The points (f) and (g) correspond to both capacitor electrode sides of a third capacitor 19.

Using the gate signal from the control circuit 9, the ON/OFF control is alternately performed to the fifth and sixth switch elements 14 and 15 at a third chopping frequency f3, for example, at 150 Hz which is triple the first chopping frequency f1.

Using the gate signal from the control circuit 9, PWM control is performed to the seventh and eighth switch elements 16 and 17 at a high frequency f4, for example, at 18 kHz which is higher than the third chopping frequency f3.

The series-connected portion of the fifth and sixth switch elements 14 and 15 in the third chopper circuit 7 is connected to the series-connected portion of the third and fourth switch elements 12 and 13 in the second chopper circuit 6. In FIG. 1, a point (e) designates the connection point.

A noise filter 8 including a reactor 20 and a fourth capacitor 21 is connected to the series-connected portion of the seventh and eighth switch elements 16 and 17 in the third chopper circuit 7. In FIG. 1, a point (h) designates the connection point.

A load (not illustrated) and the commercial power source 2 are connected to the noise filter 8.

The control circuit 9 measures a system voltage Vs and a system current Is through a differential amplifier circuit (not illustrated), and calculates an instruction value (a sinusoidal voltage) V* of a sinusoidal target voltage synchronized with the system frequency of the commercial power source 2 like the conventional example. The control circuit 9 measures end-to-end voltages Vd1, Vd2, and Vd3 at the first to third capacitors 4, 18, and 19 through the differential amplifier circuit (not illustrated), and generates the gate signal in order to control the chopper circuits 5 to 7.

The voltage Vd1 is a DC output voltage of the photovoltaic panel 1, which emerges at the point (b) based on the voltage at the point (a) that is of the ground.

The voltage Vd2 is a charge voltage at the capacitor electrode point (c) of the second capacitor 18 of the second chopper circuit 6 based on the capacitor electrode point (d).

The voltage Vd3 is a charge voltage at the capacitor electrode point (g) of the third capacitor 19 of the third chopper circuit 7 based on the capacitor electrode point (f).

Figure 2:
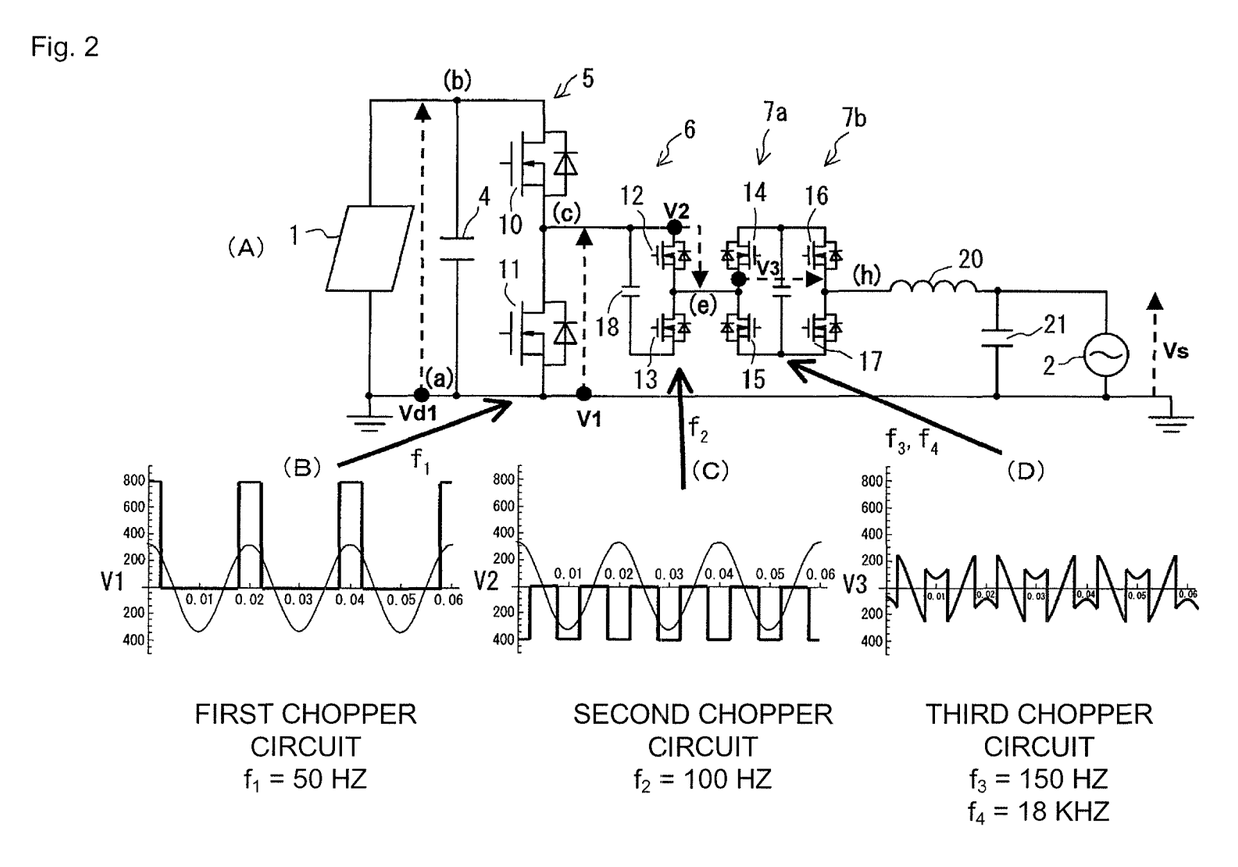
FIG. 2 is a view illustrating an operation of a power conditioner in FIG. 1.

FIG. 2 is a view schematically illustrating operations of the chopper circuit 5 to 7 of the embodiment. FIG. 2(A) is a configuration diagram of a main part in FIG. 1, and FIGS. 2(B) to 2(D) illustrate voltages V1, V2, and V3 in FIG. 2(A). In FIGS. 2(B) and 2(C), a waveform of the sinusoidal voltage V* synchronized with the system is illustrated by a thin solid line.

Assuming that a first reference potential is a potential at the point (a) that is of the ground, the voltage V1 is the voltage at the point (c) that is of the series-connected portion of the first and second switch elements 10 and 11 in the first chopper circuit 5.

Assuming that a second reference potential is a potential at the point (c), the voltage V2 is the voltage at the point (e) that is of the series-connected portion of the third and fourth switch elements 12 and 13 in the second chopper circuit 6.

The voltage V3 is the voltage at the point (h) that is of the series-connected portion of the seventh and eighth switch elements 16 and 17 based on the point (e) that is of the series-connected portion of the fifth and sixth switch elements 14 and 15 in third chopper circuit 7.

In the case of 50 Hz that is equal to the system frequency of the commercial power source 2, in the first chopper circuit 5, the ON/OFF control is alternately performed to the first and second switch elements 10 and 11 at the first chopping frequency f1 of 50 Hz that is equal to the system frequency.

Therefore, a voltage waveform at the point (c) that is of the series-connected portion of the first and second switch elements 10 and 11 becomes a first pulse voltage series including plural pulse voltages of the voltage V1 on the positive side of the potential at the point (a) as illustrated in FIG. 2 (B). The voltage V1 becomes the DC output voltage of the photovoltaic panel 1.

In the second chopper circuit 6, the ON/OFF control is alternately performed to the third and fourth switch elements 12 and 13 at the second chopping frequency f2 of 100 Hz that is double the first chopping frequency f1.

Therefore, as illustrated in FIG. 2(C), the voltage V2 at the point (e) that is of the series-connected portion of the third and fourth switch elements 12 and 13 becomes a second pulse voltage series including plural pulse voltages that fall onto the negative side based on the point (c) that is of the series-connected portion of the first and second switch elements 10 and 11.

A pulse voltage level of the voltage V2 is controlled so as to become ½ of the DC output voltage Vd1.

Figure 4:
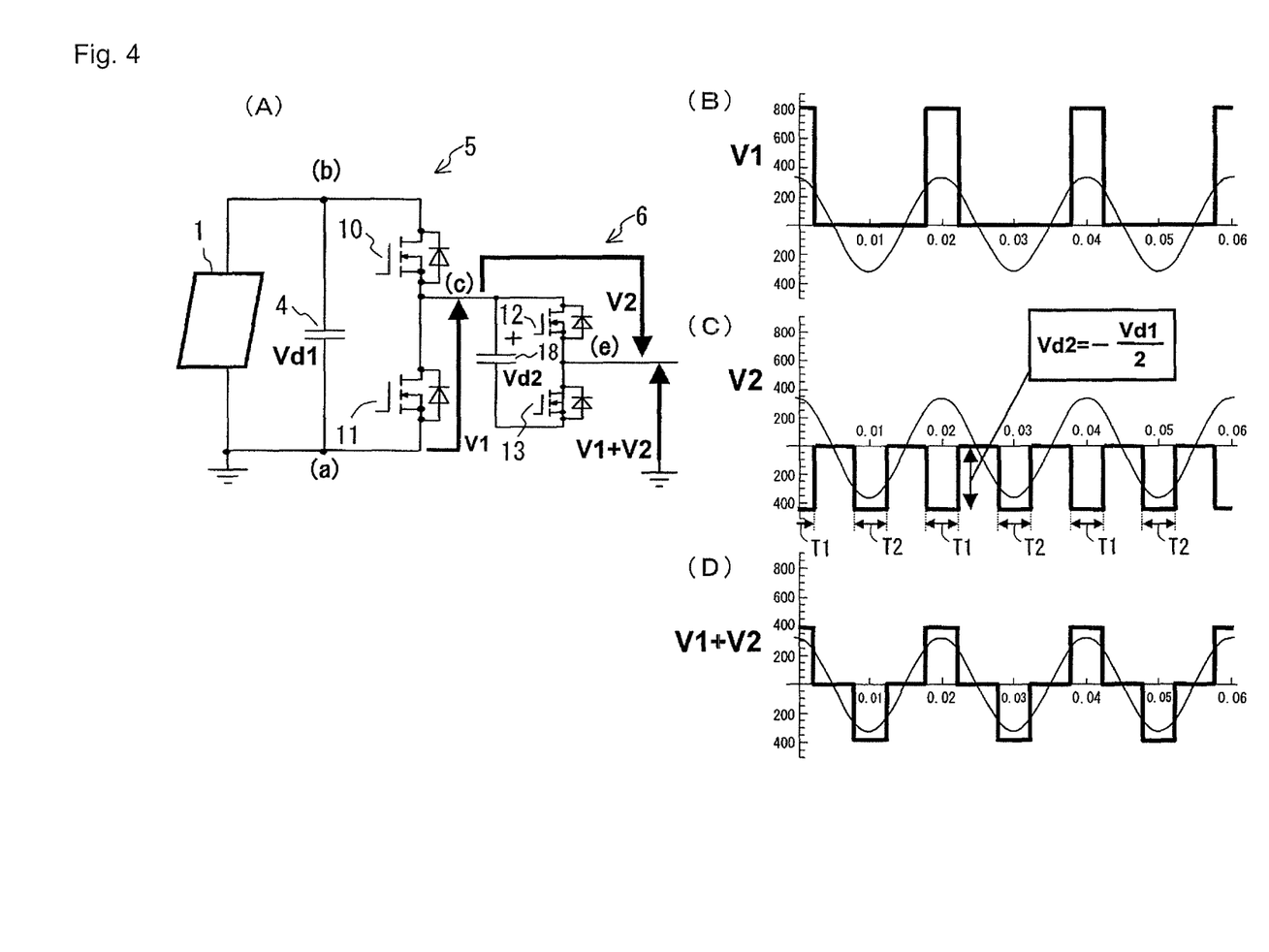
FIG. 4 is a view illustrating an operating principle of a second chopper circuit in FIG. 1.

Based on the point (a) that is of the ground, namely, based on the first reference potential, the voltage V2 at the point (e) that is of the series-connected portion of the third and fourth switch elements 12 and 13 in the second chopper circuit 6 becomes a pulse voltage V1+V2 in which the voltage V1 between the points (a) and (c) and the voltage V2 between the points (c) and (e) are added as illustrated in FIG. 4(D). That is, the pulse voltage V1+V2 has a stepwise waveform corresponding to the sinusoidal wave that changes alternately into positive and negative values. The stepwise pulse voltage V1+V2 changes alternately into positive and negative values in synchronization with the instruction value V* of the sinusoidal target voltage, which is illustrated by the thin solid line in FIG. 4(D).

In the third chopper circuit 7, the fifth and sixth switch elements 14 and 15 are alternately turned on and off at the third chopping frequency f3 of 150 Hz that is triple the first chopping frequency f1 such that a difference voltage between the stepwise pulse voltage V1+V2 and the sinusoidal voltage V* is compensated. In the third chopper circuit 7, the seventh and eighth switch elements 16 and 17 are alternately turned on and off at the frequency f4 of 18 kHz.

Therefore, the voltage V3 at the point (h) that is of the series-connected portion of the seventh and eighth switch elements 16 and 17 in the third chopper circuit 7 in FIG. 2(A) becomes the positive side when the fifth switch element 14 is off while the sixth switch element 15 is on as illustrated in FIG. 2(D). The voltage V3 becomes the negative side when the fifth switch element 14 is on while the sixth switch element 15 is on. Magnitude of the voltage V3 corresponds to the difference voltage between the stepwise-waveform voltage V1+V2 and the sinusoidal voltage V*, and the difference voltage corresponds to magnitude of each of on/off duty of the seventh and eighth switch elements 17 and 18.

Operating principles of the first to third chopper circuits 5 to 7 will be described in detail below.

Figure 3:
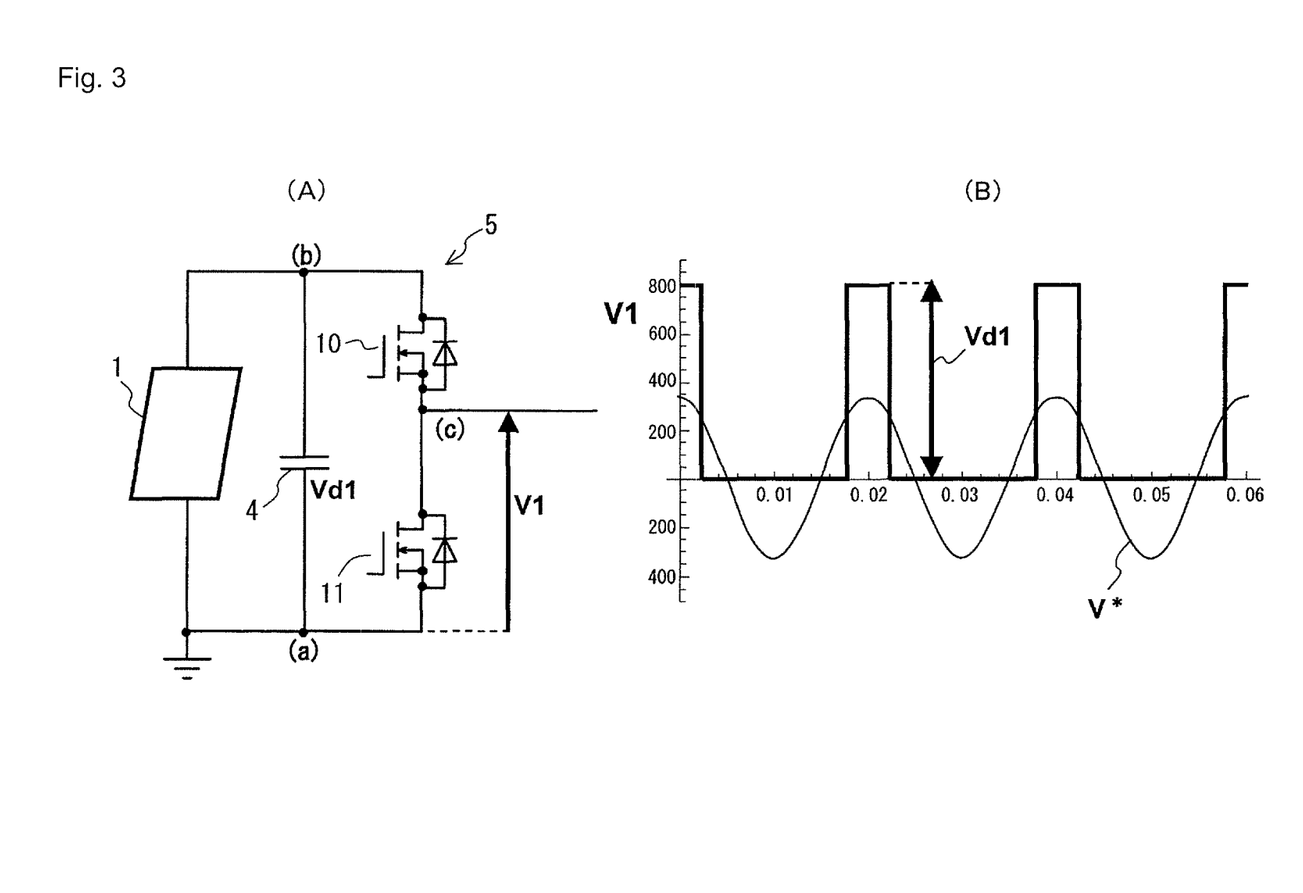
FIG. 3 is a view illustrating an operating principle of a first chopper circuit in FIG. 1.

FIG. 3 is a view illustrating the operating principle of the first chopper circuit 5, FIG. 3(A) illustrates the photovoltaic panel 1, the first capacitor 4, and the first chopper circuit 5, and FIG. 3(B) illustrates the voltage V1 between the points (a) and (c). Particularly, the sinusoidal voltage V* is illustrated by the thin solid line in FIG. 3(B).

The DC output voltage Vd1 of the photovoltaic panel 1 emerges at the point (b) that is of the positive-electrode side of the photovoltaic panel 1. The DC output voltage Vd1 is smoothed by the first capacitor 4 while the potential at the point (a) that is of the ground is set to the first reference potential.

In the first chopper circuit 5, the DC output voltage Vd1 is chopped by the first and second switch elements 10 and 11 to which the ON/OFF control is alternately performed at the first frequency f1 of 50 Hz.

When the first switch element 10 is on while the second switch element 11 is off, the charge voltage Vd1 of the first capacitor 4 that is of the voltage at the point (b) emerges at the point (c) that is of the series-connected portion of the first and second switch elements 10 and 11 in the first chopper circuit 5.

When the first switch element 10 is off while the second switch element 11 is on, the ground voltage at the point (a) emerges at the point (c) that is of the series-connected portion of the first and second switch elements 10 and 11 in the first chopper circuit 5.

Accordingly, as described above, the voltage V1 at the point (c) that is of the series-connected portion of the first and second switch elements 10 and 11 becomes the first pulse voltage series including the plural pulse voltages that rise onto the positive side while the ground potential is set to the first reference potential as illustrated in FIG. 3(B). The pulse voltage V1 is the voltage at the point (c) that is of the series-connected portion of the first and second switch elements 10 and 11 based on the point (a), and the pulse voltage level becomes the DC output voltage Vd1 of the photovoltaic panel 1, for example, 800 V.

In the first chopper circuit 5, the pulse voltage series in which a phase agrees with that of the system voltage is generated, so that an effective electric power can be output.

FIG. 4 is a view illustrating the operating principle of the second chopper circuit 6, FIG. 4(A) illustrates the first chopper circuit 5 and the second chopper circuit 6, FIG. 4(B) illustrates the voltage V1, FIG. 4(C) illustrates the voltage V2, and FIG. 4(D) illustrates the voltage V1+V2. In FIGS. 4(B) to 4(D), the sinusoidal voltage V* is also illustrated by the thin solid line.

In the second chopper circuit 6, the voltage V1 at the point (c) in FIG. 4(B) is chopped by the third and fourth switch elements 12 and 13 to which the ON/OFF control is alternately performed at the second chopping frequency f2 of 100 Hz.

When the third switch element 12 is on while the fourth switch element 13 is off, the point (e) that is of the series-connected portion of the third and fourth switch elements 12 and 13 becomes the potential equal to that at the point (c) that is of the series-connected portion of the first and second switch elements 10 and 11 in the first chopper circuit 5. When the third switch element 12 is off while the fourth switch element 13 is on, the potential at the point (e) that is of the series-connected portion of the third and fourth switch elements 12 and 13 becomes negative compared with the potential at the point (c). As described above, the voltage V2 at the point (e) that is of the series-connected portion of the third and fourth switch elements 12 and 13 becomes the second pulse voltage series including the plural pulse voltages that fall onto the negative side while the potential at the point (c) that is of the series-connected portion of the first and second switch elements 10 and 11 is set to the second reference potential as illustrated in FIG. 4(C).

When the first switch element 10 of the first chopper circuit 5 is turned on while the second switch element 11 turned off, the third switch element 12 of the second chopper circuit 6 is turned off, and the fourth switch element 13 is turned on, thereby charging the second capacitor 18. When the first switch element 10 of the first chopper circuit 5 is turned off while the second switch element 11 turned on, the third switch element 12 of the second chopper circuit 6 is turned off, and the fourth switch element 13 is turned on, whereby the second capacitor 18 is discharged through the switch elements 11 and 13 that are on. As illustrated in FIG. 4(C), the second capacitor 18 alternately repeats charge during a charge cycle T1 and discharge during a discharge cycle T2 to generate the pulse voltage that falls onto the negative side based on the second reference potential at the point (c). The voltage level Vd2 of the pulse is a half (Vd2=−Vd1/2) of the DC output voltage Vd1 of the photovoltaic panel 1, for example, 400 V.

The voltage V2 is the voltage at the point (e) that is of the series-connected portion of the third and fourth switch elements 12 and 13 based on the point (c) that is of the series-connected portion of the first and second switch elements 10 and 11. Accordingly, in the second chopper circuit 6, the voltage V1+V2 in which the voltage between the points (a) and (c) in FIG. 4(B) and the voltage between the points (c) and (e) in FIG. 4(C) are added emerges at the point (e) while the potential at the point (a) that is of the ground is set to the first reference potential. That is, the voltage V1+V2 becomes the stepwise-waveform voltage that changes alternately into the positive and negative values according to the change in sinusoidal voltage V* in FIG. 4(D). In the second chopper circuit 6, the pulse voltage series that falls onto the negative side is generated, so that the even harmonics can be removed. In the second chopper circuit 6, the charge and the discharge are repeated with the equal electric power, the effective electric power becomes zero in principle.

Figure 5:
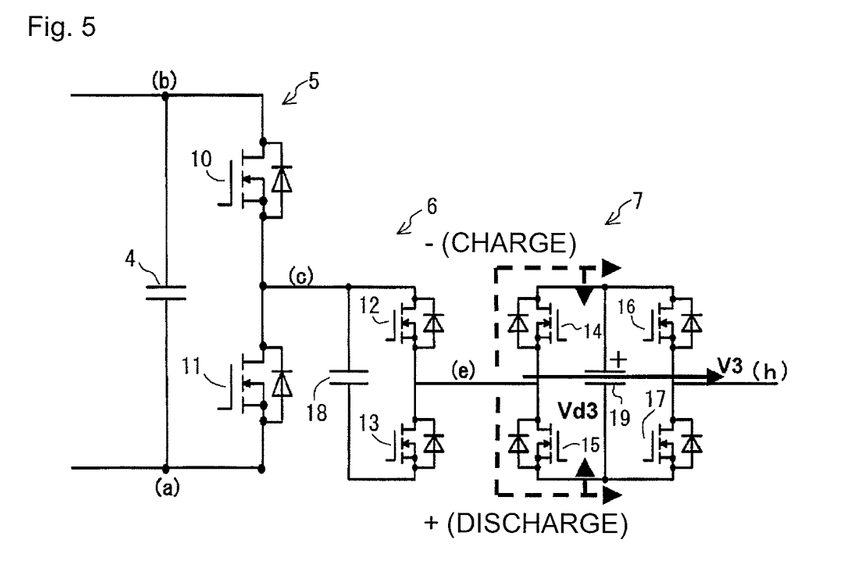
FIG. 5 is a view illustrating an operating principle of a third chopper circuit in FIG. 1.
Figure 6:
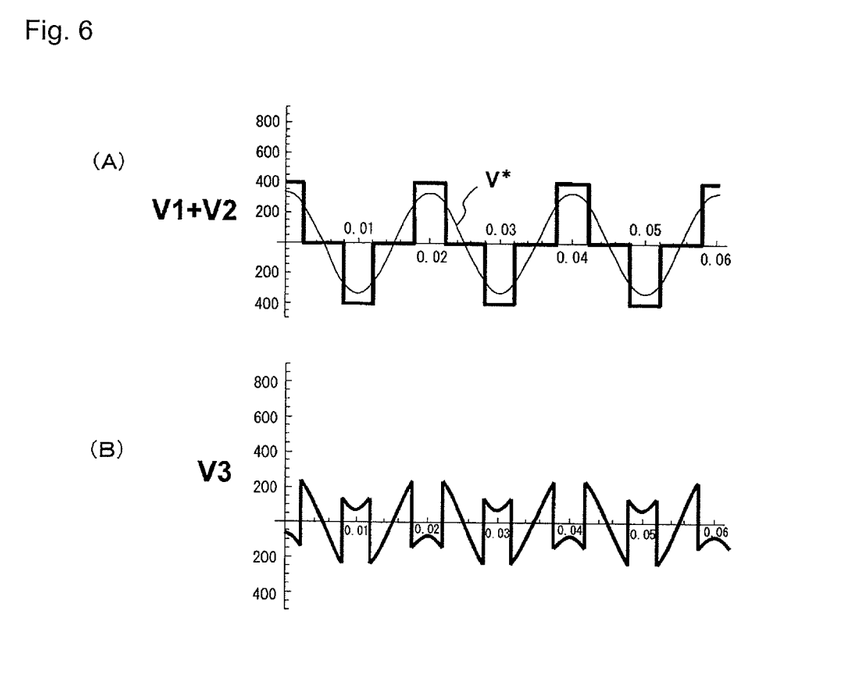
FIG. 6 is a view illustrating a voltage waveform of each unit in FIG. 5.

FIG. 5 is a view illustrating the operating principle of the third chopper circuit 7. FIG. 6(A) illustrates the stepwise pulse voltage V1+V2, and FIG. 6(B) illustrates the voltage V3 at the point (h) that is of the series-connected portion of the seventh and eighth switch elements 16 and 17 based on the point (e) that is of the series-connected portion of the fifth and sixth switch elements 14 and 15. In FIG. 6(A), the sinusoidal voltage V* is also illustrated by the thin solid line.

The ON/OFF control is performed to the fifth and sixth switch elements 14 and 15 in timing corresponding to the positive and negative difference voltages between the stepwise-waveform voltage V1+V2 at the point (e) in FIG. 6(A) and the sinusoidal voltage V*. As a result, the third capacitor 19 is charged and discharged at the voltage V1+V2 in timing of the ON/OFF control.

In other words, when the voltage V1+V2 is larger than the sinusoidal voltage V* (voltage V1+V2>sinusoidal voltage V*), the difference voltage is positive, the fifth switch element 14 is controlled on, and the sixth switch element 15 is controlled off. As a result, the third capacitor 19 is charged at the voltage V1+V2.

On the other hand, when the voltage V1+V2 is smaller than the sinusoidal voltage V* (voltage V1+V2<sinusoidal voltage V*), the difference voltage is negative, the fifth switch element 14 is controlled off, and the sixth switch element 15 is controlled on. As a result, the third capacitor 19 charged at the voltage V1+V2 is discharged.

The cycle of the difference voltage is 150 Hz that is of the third chopping frequency f3, and therefore the ON/OFF control is alternately performed to the fifth and sixth switch elements 14 and 15 at the third chopping frequency f3.

Additionally, in the third chopper circuit 7, the seventh and eighth switch elements 16 and 17 are controlled at the PWM frequency f4 of 18 kHz that is several hundred times higher than the first chopping frequency f1 in the on/off duty cycle that corrects the difference voltage between the voltage V1+V2 and the sinusoidal voltage V*. Therefore, as illustrated in FIG. 6(B), the voltage V3 corresponding to the difference voltage between the stepwise pulse voltage V1+V2 and the sinusoidal voltage V* emerges at the point (h) that is of the series-connected portion of the seventh and eighth switch elements 16 and 17.

The voltage V3 indicates a PWM average value of the on/off duty control, and the voltage V3 is the voltage at the point (h) that is of the series-connected portion of the seventh and eighth switch elements 16 and 17 based on the point (e) that is of the series-connected portion of the fifth and sixth switch elements 14 and 15.

Accordingly, in the third chopper circuit 7, the sinusoidal voltage V* emerges at the point (h) that is of the series-connected portion of the seventh and eighth switch elements 16 and 17 based on the first reference potential at the point (a) that is of the ground. The voltage V1+V2 between the points (a) and (e) in FIG. 6(A) and the voltage V3 between the points (e) and (h) in FIG. 6(B) are added in the sinusoidal voltage V*, and the sinusoidal voltage V* is in-phase with the change in electric power system frequency illustrated by the thin solid line in FIG. 6(A).

Figure 7:
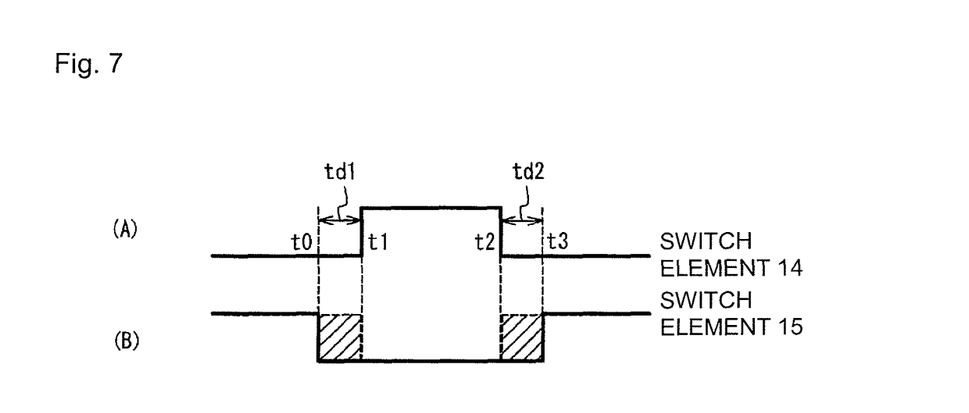
FIG. 7 is a view illustrating a deadtime in two switch elements connected in series.

The suppression of a waveform disturbance in part of the sinusoidal voltage V* in the power conditioner will be described below with reference to FIGS. 7 and 8. FIG. 7(A) illustrates an on/off waveform of the upper-side switch element 14 of the first group in the switch elements 14 and 15 of the first group and the switch elements 16 and 17 of the second group. FIG. 7(B) illustrates an on/off waveform of the lower-side switch element 15 of the first group. The on/off frequency is 150 Hz. The chopper circuits 5 and 6 have the on/off frequencies of 50 Hz and 100 Hz, respectively. The chopper circuits 5 and 6 are identical to the third chopper circuit 7 in the on/off waveform although the chopper circuits 5 and 6 differ from the third chopper circuit 7 in on/off of the pulse voltage on a time axis.

One of the switch elements 14 and 15 is off (the voltage level is a low level) when the other is on (the voltage level is a high level), one of the switch elements 14 and 15 is on when the other is off, and deadtimes td1 and td2 are provided between on switching and off switching. The deadtime td1 is located between clock times t0 and t1, and the deadtime td2 is located between clock times t2 and t3. Both the switch elements 14 and 15 are off in the deadtimes td1 and td2. The deadtimes td1 and td2 are a period that is provided such that the switch elements 14 and 15 are not simultaneously turned on.

However, for example, even if both the switch elements 14 and 15 are off in the deadtime td1, the current is passed through the diode connected in inversely parallel with each of the switch elements 14 and 15. Therefore, an effective period of the switch element 15 in FIG. 7(B) is lengthened by the deadtimes td1 and td2 indicated by hatching. Assuming that the deadtimes td1 and td2 are equal to each other (td1=td2), the effective period of the switch element 15 becomes double the deadtime td1.

Therefore, the effective on period (the high level) in the switch element 14 becomes clock time t1−t2=T as illustrated in FIG. 7(A), and normally the effective period of the switch element 15 also becomes T like the switch element 14. However, the effective period of the switch element 15 is double the deadtime td1 longer than that of the switch element 14. In the case that the difference voltage V3 between the voltage (V1+V2) in FIG. 6(A) and the sinusoidal voltage V* is generated by turning on and off the switch elements 14 and 15, although the difference voltage V3 changes to the positive and negative sides, timing of positive and negative changes of the difference voltage V3 is deviated from proper timing due to an imbalance between the effective on periods of the switch elements 14 and 15. As a result, in the case that the sinusoidal voltage V* is generated from a combination of the voltage V1+V2 in FIG. 6(A) and the difference voltage V3 in FIG. 6(B), a distortion is generated in part of the waveform of the sinusoidal voltage V*.

Therefore, in the embodiment, as illustrated in FIGS. 8(A) to 8(G), the distortion in part of the waveform of the sinusoidal voltage V* can effectively be suppressed and removed by adjusting the on/off duty of the switch elements 16 and 17 of the third chopper circuit 7.

Figure 8:
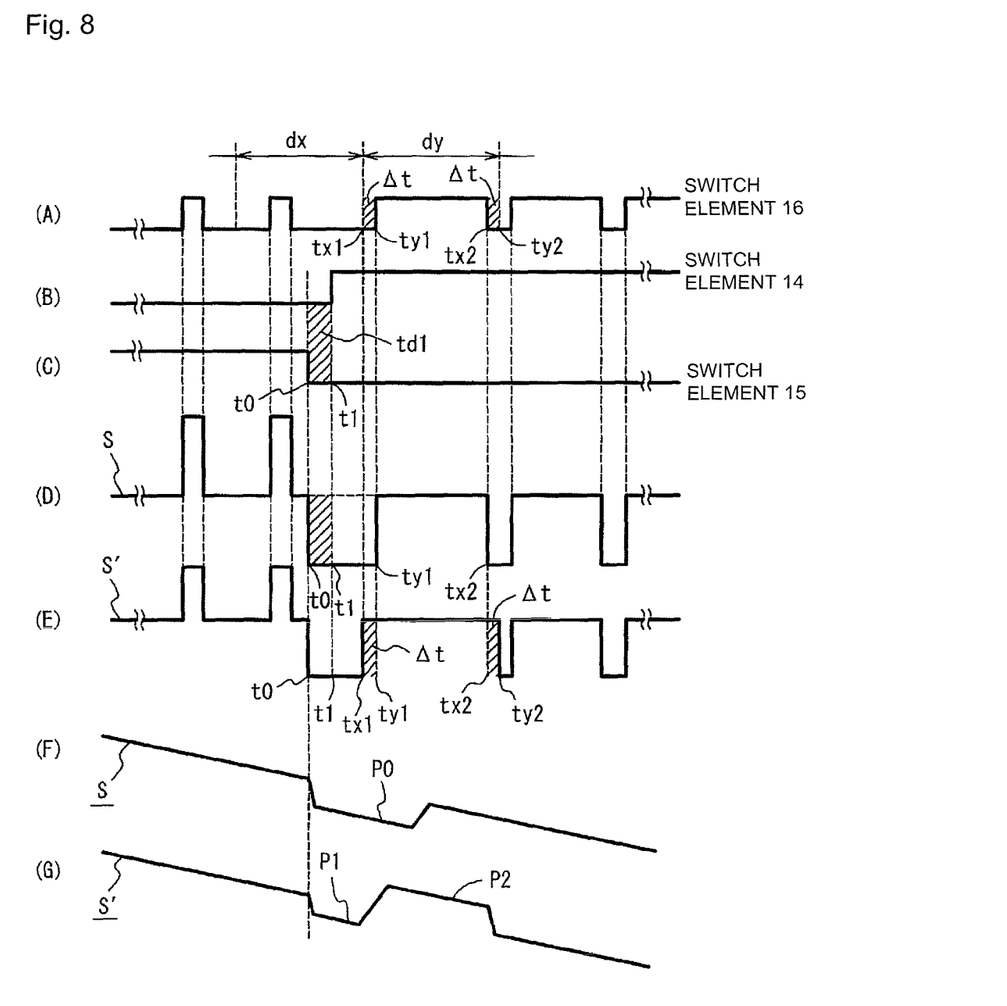
FIG. 8 is a view illustrating a timing chart in which a distortion in part of a sinusoidal voltage is suppressed.

FIG. 8(A) typically illustrates on/off timing of the seventh switch element 16 in the seventh and eighth switch elements 16 and 17 of the third chopper circuit 7. The signs dx and dy designate on/off duty of the seventh switch element 16, and the on/off duty dx and dy are switched at a clock time tx1. For the later-described reason, the on/off duty dy is changed from clock times ty1 to tx2 to clock times tx1 to ty2 in order to suppress and remove the distortion in part of the waveform of the sinusoidal voltage V*. That is, in the example in FIG. 8, a rising on period of the seventh switch element 16 is lengthened by a period (2αt) indicated by hatching.

The reason the rising on period of the seventh switch element 16 is lengthened by a period (2αt) indicated by the hatching is as follows. In the fifth and sixth switch elements 14 and 15, for example, as illustrated in FIG. 8(C), normally the sixth switch element 15 enters the deadtime td1 that is of a non-effective off period from the effective on period that is of the high level at a clock time t0, and the sixth switch element 15 is in the deadtime td1 that is of the non-effective off period between the clock time t0 and a clock time t1. However, the sixth switch element 15 does not become non-effective off, but the sixth switch element 15 continues the same state as the effective on state until the clock time t1 by the diode connected in inversely parallel. Therefore, the deadtime td1 between the clock time t0 and t1 indicated by the hatching is calculated by a CPU (not illustrated) incorporated in the control circuit 9, and the CPU changes the on/off duty of the seventh and eighth switch elements 16 and 17 according to the deadtime td1 as indicated by the hatching in FIG. 8(A).

As a result, in the case that the on/off duty of the seventh and eighth switch elements 16 and 17 are not changed according to the deadtime td1 from a clock time tx, as illustrated in FIG. 8(D), a waveform S of the sinusoidal voltage V* rises at the clock time ty1, and falls at the clock time tx2. In an averaging waveform S, the distortion is generated in a part P0 as illustrated in FIG. 8(F). On the other hand, in the case that the on/off duty of the seventh and eighth switch elements 16 and 17 are changed according to the deadtime td1 from the clock time tx as indicated by the hatching in FIG. 8(A), a waveform S' of the sinusoidal voltage V* rises at the clock time tx1 before the clock time ty1 by Δt as illustrated in FIG. 8(E), and falls at the clock time ty2 after the clock time tx2 by Δt. In an averaging waveform S', as illustrated in FIG. 8(G), a positive-side distortion P1 and a negative-side distortion P2 emerge, and the distortions P1 and P2 are canceled.

Thus, the distortion, which is generated in the waveform of the sinusoidal voltage V* due to the imbalance between the effective on periods of the switch elements 14 and 15 in FIGS. 8(B) and 8(C), can be suppressed and removed.

In the embodiment, the problem, which is generated in the deadtime in which both the switch elements 14 and 15 are turned off due to the diode connected inversely parallel with each of the switch elements 14 and 15 when the switch elements 14 and 15 in the third chopper circuit 7 are collected as the first group, is described. Similarly, the problem, which is generated in the deadtime in which both the switch elements 10 and 11 are turned off due to the diode connected inversely parallel with each of the switch elements 10 and 11 when the switch elements 10 and 11 in the first chopper circuit 5 are collected as the first group, and the problem, which is generated in the deadtime in which both the switch elements 12 and 13 are turned off due to the diode connected inversely parallel with each of the switch elements 12 and 13 when the switch elements 12 and 13 in the second chopper circuit 6 are collected as the first group, can be solved by adjusting the on/off duty of the seventh and eighth switch elements 16 and 17.

As described above, in the embodiment, the calculation means (calculator processor) calculates the offset between the timing in which the third pulse voltage series is chopped according to the positive and negative differences with the sinusoidal voltage and the timing of the switching between the on/off duty of the seventh and eighth switch elements, and the duty control means (duty controller processor) controls the on/off duty of the seventh and eighth switch elements according to the timing offset. Therefore, the generation of the voltage spike in part of the waveform of the generated sinusoidal voltage is suppressed. The calculation means and the duty control means can be implemented by software in the control circuit.

The present disclosure includes a power conversion apparatus including a first chopper circuit, a second chopper circuit, and a third chopper circuit.

The first chopper circuit chops the DC voltage at a first chopping frequency, and generates a first pulse voltage series including plural pulse voltages that change onto the positive sides with respect to the first reference potential in which the voltage level is the ground potential.

The second chopper circuit chops the output of the first chopper circuit at a second chopping frequency higher than the first chopping frequency while the potential at the first pulse voltage series is set to the second reference potential, and the second chopper circuit generates a second pulse voltage series including plural pulse voltages. The voltage level of each of the pulse voltages is lower than that of the positive-side first pulse voltage series, and the pulse voltages change onto the negative side with respect to the second reference potential. Additionally, the second chopper circuit adds the first and second pulse voltage series to generate a third pulse voltage series in which the first and second pulse voltage series change alternately in a sinusoidal manner onto the positive and negative sides with respect to the first reference potential.

The third chopper circuit performs charge and discharge output by chopping the third pulse voltage series at a third chopping frequency that is defined by timing corresponding to the positive and negative of the difference with the sinusoidal voltage. Additionally, the third chopper circuit performs the PWM control to the charge and discharge output at the PWM frequency higher than the third chopping frequency so as to correct the difference between the third pulse voltage series and the sinusoidal voltage, and the third chopper circuit obtains the sinusoidal voltage, which changes continuously on the positive and negative sides with respect to the first reference potential, using the third pulse voltage series and the PWM output.

The present disclosure includes a power generation system including the DC power source and the power conditioner connected to the DC power source. The power generation system converts the DC power generated by the DC power source into the AC power with the power conditioner, and performs the linkage operation with the commercial power source. Particularly, the power conditioner includes the power generation system including pulse voltage generating means (pulse voltage generator) and sinusoidal voltage generating means (sinusoidal voltage generator).

The pulse voltage generating means chops the DC voltage from the DC power source at a chopping frequency related with the system frequency, and generates the pulse voltage series including the plural pulse voltages in each of which the voltage level changes alternately in the sinusoidal manner onto the positive and negative sides with respect to the reference potential. Additionally, the pulse voltage generating means performs the charge and discharge output of the pulse voltage series in the timing corresponding to the positive and negative of the difference with sinusoidal voltage.

The sinusoidal voltage generating means performs the PWM control of the charge and discharge output at the PWM frequency higher than the chopping frequency so as to correct the difference between the pulse voltage series and the sinusoidal voltage. Therefore, the sinusoidal voltage generating means obtains the sinusoidal voltage that changes continuously onto the positive and negative sides with respect to the reference potential from the pulse voltage series and the PWM output. Additionally, the sinusoidal voltage generating means outputs the sinusoidal voltage onto the load side.

The present disclosure includes a power generation system including the DC power source and the power conditioner connected to the DC power source. The power generation system converts the DC power generated by the DC power source into the AC power, and performs the linkage operation with the commercial power source. Particularly, the power conditioner includes a first chopper circuit, a second chopper circuit, and a third chopper circuit.

The first chopper circuit chops the DC voltage from the DC power source at a first chopping frequency that is of the system frequency, and generates the first pulse voltage series including the plural pulse voltages in each of which the voltage level changes on the positive side with respect to the first reference potential.

The second chopper circuit chops the output of the first chopper circuit at a second chopping frequency that is predetermined times higher than the first chopping frequency while the potential at the first pulse voltage series is set to the second reference potential, and the second chopper circuit generates a second pulse voltage series including plural pulse voltages. The voltage level of each of the pulse voltages is lower than that of the positive-side first pulse voltage series, and the pulse voltages change onto the negative side with respect to the second reference potential. Additionally, the second chopper circuit adds the first and second pulse voltage series to generate a third pulse voltage series in which the first and second pulse voltage series change alternately in a sinusoidal manner onto the positive and negative sides with respect to the first reference potential.

The third chopper circuit performs the charge and discharge output by chopping the third pulse voltage series at a third frequency that is defined by timing corresponding to the positive and negative of the difference with the sinusoidal voltage, and the third chopper circuit performs the PWM control of the charge and discharge output at the PWM frequency higher than the third chopping frequency so as to correct the difference between the third pulse voltage series and the sinusoidal voltage. Additionally, the third chopper circuit obtains the sinusoidal voltage that changes continuously onto the positive and negative sides with respect to the first reference potential using the third pulse voltage series and the PWM output, and outputs the sinusoidal voltage onto the load side.

DESCRIPTION OF SYMBOLS

1 Photovoltaic panel
2 Commercial power source
3 Power conditioner
5 First chopper circuit
10,11 First and second switch elements
6 Second chopper circuit
12,13 Third and fourth switch elements
7 Third chopper circuit
14,15 Fifth and sixth switch elements (first group)
16,17 Seventh and eighth switch elements (second group)
19 Capacitor

What is claimed is:

1. A power conditioner comprising:
a first switch circuit including a pair of switches connected in series with each other, a diode being connected in inverse parallel with each of the switches, the switches configured to be alternately turned on and off at a predetermined chopping frequency;
a second switch circuit including a pair of switches connected in series with each other, a diode being connected in inverse parallel with each of the switches of the second switch circuit, the switches of the second switch circuit configured to be alternately turned on and off at a PWM frequency higher than the chopping frequency; and
a controller processor configured to perform on/off control of each of the switches of the first and second switch circuits while a dead-time is provided,
wherein the controller processor is configured to adjust and control on/off duty of the switches in the second switch circuit according to an effective on drive in one of the switches using each diode during the dead-times of the switches of the first switch circuit.

2. A power conditioner comprising:
a first switch circuit and a second switch circuit connected in parallel with each other, each of the first and second switch circuits including two switches connected in series with each other, and a diode being connected in inverse parallel with each of the switches;
a capacitor that is connected in parallel with each of the first switch circuit and the second switch circuit; and
a controller processor configured to alternately turn on and off the switches of the first switch circuit at a predetermined chopping frequency and for alternately turning on and off the switches of the second switch circuit at a PWM frequency higher than the chopping frequency, and the controller processor configured to alternately turn on and off the switches of the first and second switch circuits while a dead-time is provided in on/off timing of each of the switches of the first and second switch circuits, wherein the controller processor forms a pulse voltage series in a first series-connected portion of the switches of the first switch circuit, forms a difference voltage according to a difference between the pulse voltage series and a sinusoidal voltage in a second series-connected portion of the switches of the second switch circuit, and controls on/off duty of the switches of the second switch circuit to obtain the sinusoidal voltage that changes to positive and negative values, and wherein the controller processor adjusts and controls the on/off duty of the switches of the second switch circuit according to an effective on drive in one of the switches using each diode during the dead-times of the switches of the first switch circuit.

3. A power conditioner comprising:

a first chopper circuit comprising a first switch circuit that includes first and second switches connected in series with each other, a diode being connected in inverse parallel with each of the first and second switches, the first and second switches configured to be alternately turned on and off at a first chopping frequency to generate a first pulse voltage series having a first voltage that becomes a positive value with respect to a first reference potential;

a second chopper circuit comprising a parallel-connected circuit that includes a second capacitor and a second switch circuit, in which one side of a parallel connection of the parallel-connected circuit is connected to the series-connected portion of the first and second switches, the second switch circuit including third and fourth switches connected in series with each other, and a diode being connected in inverse parallel with each of the third and fourth switches, the third and fourth switches configured to be alternately turned on and off at a second chopping frequency higher than the first frequency, the third and fourth switches configured to generate a second pulse voltage series having a second voltage while a potential at the first pulse voltage series is set to a second reference potential, a voltage level of the second voltage being lower than that of the first pulse voltage series, the second voltage 2 becoming a negative value with respect to the second reference potential, the third and fourth switches further configured to add voltages at the first and second pulse voltage series to form a third pulse voltage series that changes alternately in a sinusoidal manner to the positive and negative values with respect to the first reference potential;

a third chopper circuit comprising a third switch circuit that includes fifth and sixth switches connected in series with each other, and a diode being connected in inverse parallel with each of the fifth and sixth switches; seventh and eighth switches that are connected in series with each other, and a diode being connected in inverse parallel with each of the seventh and eighth switches; and a capacitor that is connected in parallel with the third switch circuit and the seventh and eighth switches, a series-connected portion of the fifth and sixth switches being connected to a series-connected portion of the third and fourth switches, the fifth and sixth switches configured to be alternately turned on and off at a third chopping frequency higher than the second chopping frequency to generate a difference voltage between the third pulse voltage series and a sinusoidal voltage, the seventh and eighth switches being turned on and off at a PWM frequency higher than the third chopping frequency to obtain the sinusoidal voltage at the series-connected portion of the seventh and eighth switches; and a controller processor configured to control an on/off duty of the seventh and eighth switches according to an on drive of one of a pair of switches in at least one of the first, second, and third switch circuits during dead-times of the pair of switches using each diode that is connected in inverse parallel with each of the pair of switches.

* * * * *